UNITED STATES PATENT OFFICE.

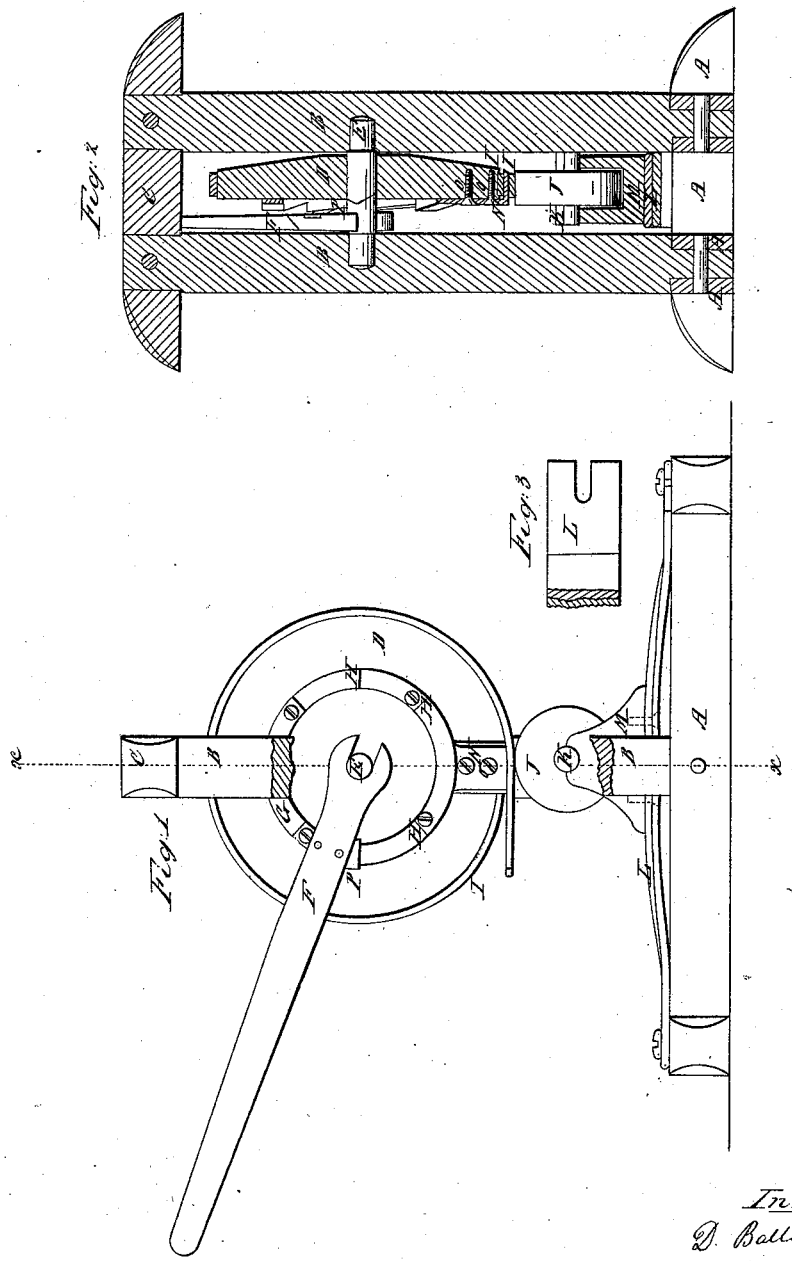

D. BALLOU, OF HAVANA, NEW YORK.

IMPROVEMENT IN TIRE-BENDING MACHINES.

Specification forming part of Letters Patent No. 55,224, dated June 5, 1866.

*To all whom it may concern:*

Be it known that I, D. BALLOU, of Havana, in the county of Schuyler and State of New York, have made new and useful Improvements in Tire-Bending Machines; and I do hereby declare the following to be a full, clear, and exact description of the nature, construction, and operation of the same, sufficient to enable one skilled in the art to which it appertains to construct and use the same, reference being had to the accompanying drawings, which are made part of this specification, and in which—

Figure 1 is a vertical elevation of the same, a part of one of the posts being removed. Fig. 2 is a vertical section on the line $x\,x$, Fig. 1. Fig. 3 is a detached view of a portion of the supporting-spring.

The same letters refer to like parts in the different figures.

This is a machine for mending tire for carriages or wagons, capable of being readily operated by one person; and it consists of a wheel revolving by means of a lever suitably connected and winding upon its periphery the iron bar intended for the tire, the iron being firmly pressed against the wheel by the friction-roller, which revolves on an elastic bearing below.

In the drawings, A is a base or foot piece for the posts B B, which are tied together at the top by a piece, C. The wheel D is journaled by its axis E in the posts, and has a ratchet-wheel, G, on its face, whose teeth H H are made the means of its operation by the hand-lever F, whose fulcrum end embraces the axis E, while its tooth P engages the notches H of the ratchet-wheel G.

The end of the iron for the tire is pushed under a plate, N, which is fastened by screws O O to the wheel D, and as the wheel is revolved the iron is drawn in between it and the roller J, whose axis K is journaled in the block M, which in turn is supported upon the spring L, so as to allow the block to recede from the wheel according to the thickness of the tire-iron, which is drawn between them by the successive motions of the lever F, which moves the wheel a notch or more at a time.

What I claim as new, and desire to secure by Letters Patent, is—

The combination of the wheel D with its holder N or its equivalent, the ratchet G H, lever F, and spring pressure-roller J K L, substantially as described and represented.

D. BALLOU.

Witnesses:
  GROVER C. HINMAN,
  D. BEEBE.